United States Patent [19]
Starr

[11] Patent Number: 5,881,118
[45] Date of Patent: Mar. 9, 1999

[54] CORE PROTECTION CALCULATOR INPUT FILTER

[75] Inventor: Thomas M. Starr, Granby, Conn.

[73] Assignee: Combustion Engineering, Inc., Windsor, Conn.

[21] Appl. No.: 997,184

[22] Filed: Dec. 23, 1997

[51] Int. Cl.$^6$ .................................................. G21C 17/00
[52] U.S. Cl. ........................................ 376/258; 376/236
[58] Field of Search .................................. 376/219, 236, 376/240, 258

[56] References Cited

U.S. PATENT DOCUMENTS

| | | | |
|---|---|---|---|
| 4,014,741 | 3/1977 | Foxworthy et al. | 376/258 |
| 4,080,251 | 3/1978 | Musick | 376/236 |
| 4,318,778 | 3/1982 | Musick | 376/216 |
| 4,330,367 | 5/1982 | Musick | 376/245 |
| 5,563,922 | 10/1996 | Beltz et al. | 376/258 |

*Primary Examiner*—Daniel D. Wasil
*Attorney, Agent, or Firm*—Alix, Yale & Ristas, LLP

[57] ABSTRACT

Changes in the value of the control element assembly position signal (26,28) are monitored over a preselected time period, and a determination is made whether these changes conform to a regular, predetermined pattern ($S_1$), characteristic of normal control element assembly motion. If any change deviates ($S_2, S_3$) from the pattern by more than a permissible tolerance, a position invalidity signal is generated.

19 Claims, 4 Drawing Sheets

CORE PROTECTION CALCULATOR INPUT FILTER

BACKGROUND OF THE INVENTION

The present invention relates to control systems for nuclear power plants, and in particular, to control systems which respond to signals indicative of the position of control rods in the reactor core.

In a typical pressurized water nuclear power reactor, a plurality of control element assemblies are supported on the nuclear reactor vessel with associated drive mechanisms for moving the control element assemblies into and out of the reactor core, for the purpose of controlling the gross power level, or the power distribution in the core. Typically, each control element assembly (CEA) has a shaft which is driven by a plurality of electromagnetic coils having latches which engage grooves on the shaft, whereby the shaft may be moved in stepwise fashion. The shaft terminates in a web or similar structure, which supports a plurality of individual control elements or rods sized to pass through openings within or between fuel assemblies which define the reactor core.

A particular nuclear reactor may have dozens of CEA's, which are typically grouped or ganged in sets of four or eight, so as to move in unison when actuated by respective drive mechanisms. Moreover, these groups may be programmed to move in an overlapping sequence, with some of the groups not actuable for normal operational power control, but rather held in reserve only in the event of a reactor trip, whereby all CEA's are disengaged from the drive mechanisms, thereby dropping under the force of gravity into the reactor core to shut down the reactor power as quickly as possible.

The generation of a reactor trip signal typically occurs in a safety control system having an algorithm which takes into account the position of the CEA's in the reactor core, in combination with many other operational variables, to assure that if the operation of the installation is expected to pass through the boundary of the permissible operating envelope, the reactor will trip.

The insertion position and movement of each CEA is typically sensed by a reed switch configuration, each having a position output signal that is sent to the safety control system. The signal is used within the safety control system as part of a calculation to determine if the reactor should be tripped. Spurious changes in a CEA position signal, not caused by actual CEA movement, can cause unnecessary trips of the reactor. Inasmuch as the trip shuts down all power generating capacity from the affected reactor, the disruption to plant operation is self-evident. At a more subtle level, however, spurious CEA position signals, can result in the safety control system determining that the reactor is operating near a boundary of its operating envelope (i.e., with low safety margin), thereby unnecessarily restricting the operator from implementing the most cost-effective system configuration or power maneuvering.

SUMMARY OF THE INVENTION

It is, accordingly, an object of the present invention to provide a method for verifying a control element assembly position signal.

This object is accomplished by monitoring changes in the value of the position signal over a preselected time period, and determining whether these changes conform to a regular, predetermined pattern, characteristic of normal control element assembly motion. If any change deviates from the pattern by more than a permissible tolerance, a position invalidity signal is generated.

In the preferred embodiment wherein the predetermined pattern characteristic of normal control element motion is a series of steps which resembles a staircase that ascends or descends, the position signal can be compared with one or more characteristics of the staircase pattern. For example, acceptance criteria can depend on the determination of the regularity of the value of the increment or decrement of the position signal, and/or the regularity in the times of occurrence of increments or decrements of the signal. A more specific validity test can require that at least four of any consecutive five increments in the position signal, have the same magnitude, or similarly, that for any five consecutive increments in the value of the position signal each of at least four increments occurs with the same elapsed time.

The invalidity signal generated according to the invention, can be delivered to the control system, whereupon an invalidity warning signal can be displayed to the operator at the control panel, and/or the invalid position signal is ignored by the safety control system, i.e., the safety control system does not respond to a change in the control element position as manifested by the change in the value of the control element position signal.

BRIEF DESCRIPTION OF THE DRAWINGS

These and other objects and advantages of the invention will become more evident to one familiar with the relevant field of technology, from the following description of the preferred embodiment in which reference is made to the accompanying drawings, wherein.

DESCRIPTION OF THE PREFERRED EMBODIMENT

Figure 1:
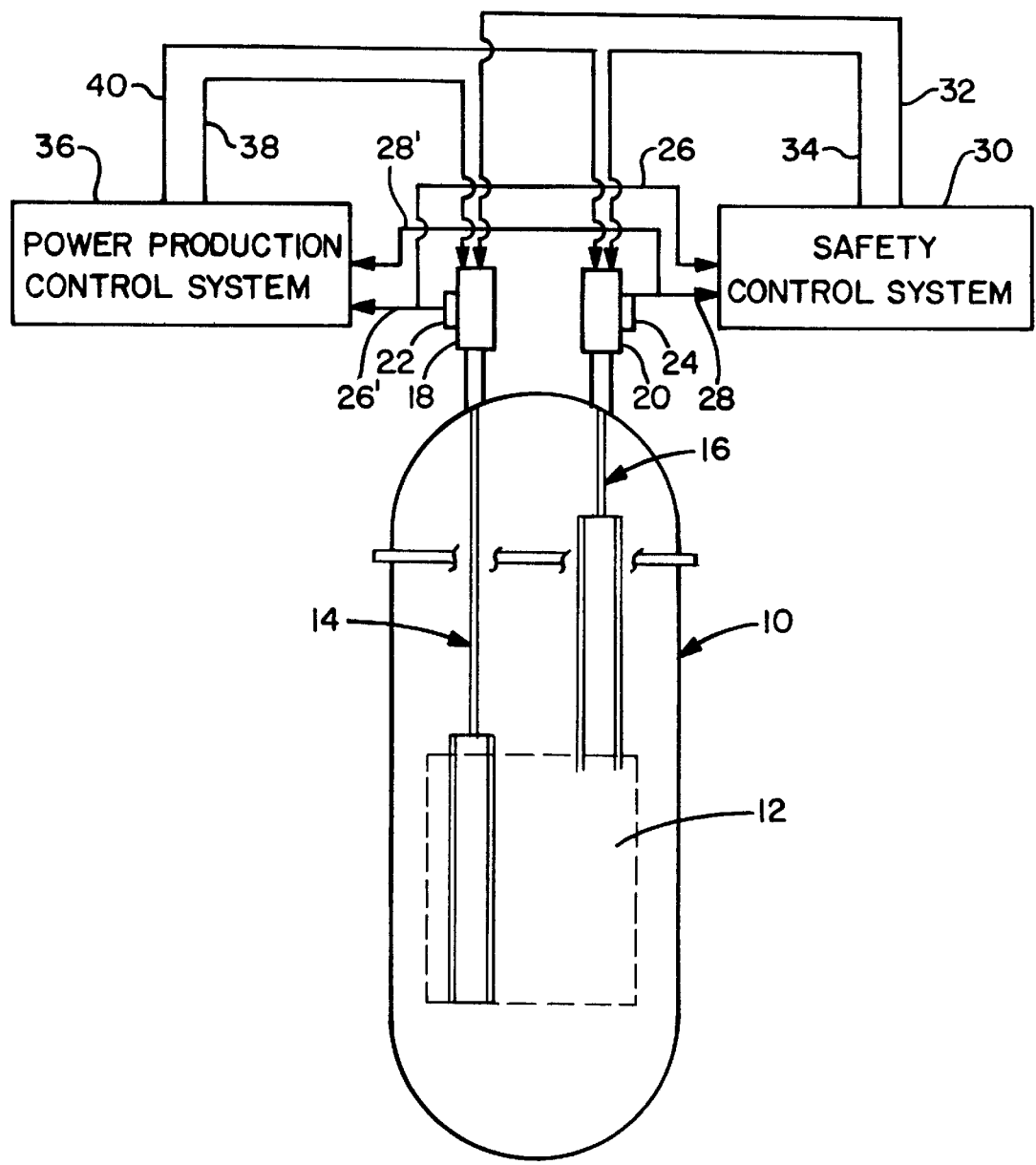
FIG. 1 is a schematic of a conventional nuclear reactor having control element assemblies and associated control systems.

FIG. 1 is a simplified representation of a nuclear reactor 10 having a reactor core 12 and a representative two 14, 16 of a multiplicity of control element assemblies, (CEA's) each movable by a respective drive mechanism 18, 20 through the reactor core. Means, 22, 24 such as reed switch configurations, are responsive to the movement of the CEA shaft, for generating a position signal 26, 28 having a value which varies with the movement of the CEA. Each position signal is delivered to a safety control system 30 which, after processing this input signal along with a multiplicity of other signals indicative of plant operating parameters, can generate a safety trip signal 32, 34 for delivery to each of the CEA drive mechanisms 18, 20, whereby the shaft of every CEA is released.

The normal operation of the reactor 10 is typically under the control of the power production control system 36. Normal plant maneuvering may include the repositioning of selected CEA's relative to the core. Position and movement are determined from reed switch output signals 26', 28', and implemented via control output lines 38, 40.

This repositioning of CEA's will always be at a pre-established, constant rate of movement, dictated by the normal operating sequence of e.g., the electromagnetic latches in the drive mechanisms 18, 20. One CEA 16 is shown at the top, or a maximum withdrawal position, whereas the other CEA 14 is shown in the bottom, or fully inserted position. The normal drive speed for operational power control via lines 38, 40 would typically be on the order of 120 latch increments, performed over approximately two minutes, i.e., a CEA drive speed of approximately one latch increment per second. On the other hand, in the event of a reactor trip signal received from the safety control system via lines 32, 34, each CEA would be dropped, with the resulting freefall resisted by the upward flow of water in the relatively narrow passageways into which the individual rods would fall. A fully withdrawn CEA 16 would take about two seconds to fully insert as a result of a trip. This corresponds to a rate which is 60 times faster than that of the drive rate (i.e., although the CEA's are not "driven" during a trip, the trip insertion rate can be expressed in terms of 60 drive increments per second).

Of course, the size, vertical dimension, and other physical characteristics of reactor cores and associated CEA's can vary from plant to plant and manufacturer to manufacturer. The quantitative values expressed throughout this specification are exemplary only, for purposes of illustrating one embodiment of the invention.

Figure 2:
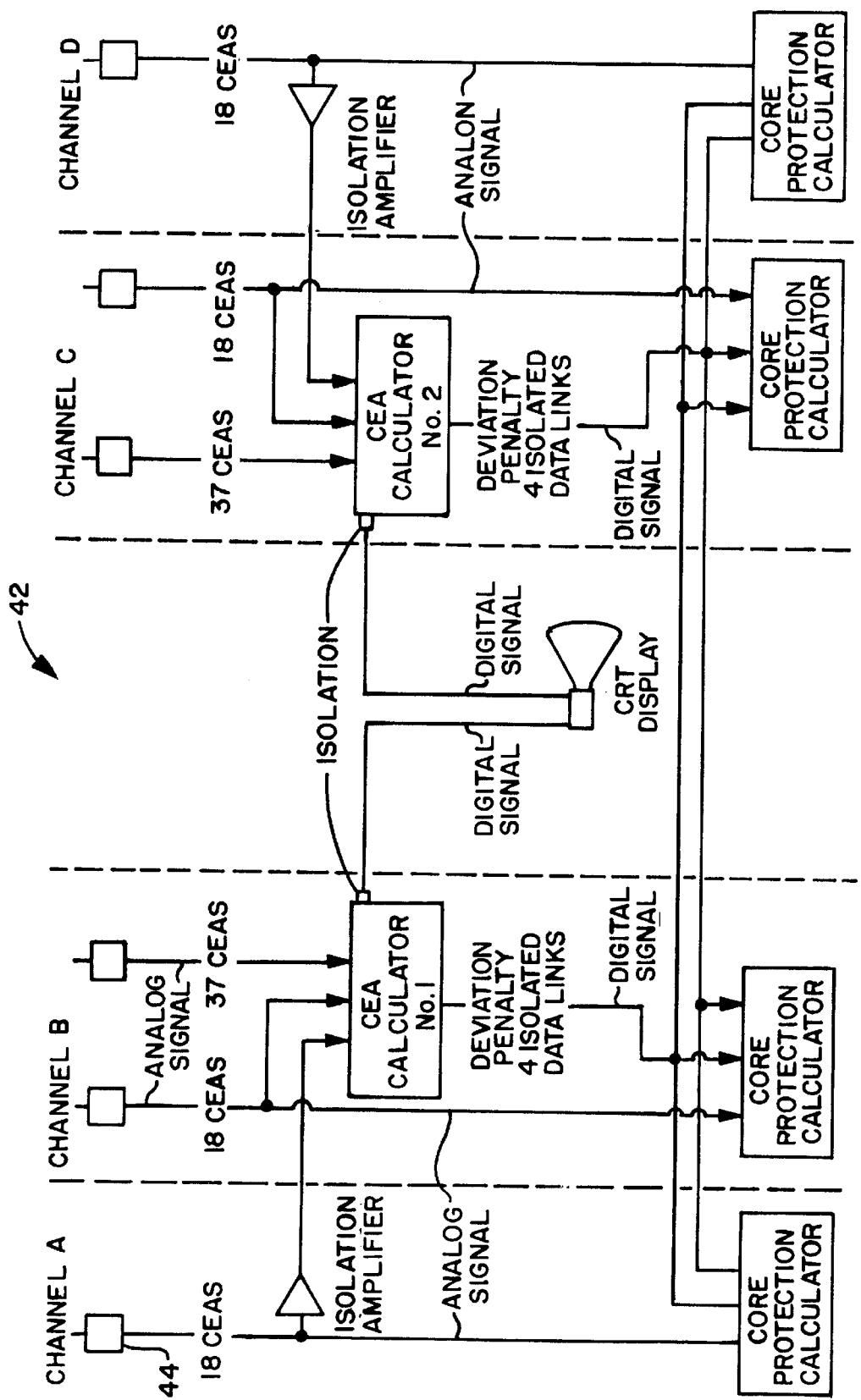
FIG. 2 is a schematic of a portion of a known reactor safety control system, which is responsive to the position of control element assemblies in the core, as modified to incorporate the present invention.

FIG. 2 is a schematic of a portion 42 of the plant safety control system 30 of FIG. 1, as commercially implemented based on U.S. Pat. Nos. 4,080,251 "Apparatus And Method For Controlling A Nuclear Reactor"; 4,318,778 "Method And Apparatus For Controlling A Nuclear Reactor"; and 4,330,367 "System And Process For The Control of A Nuclear Power System", the disclosures of which are hereby incorporated by reference. The commercially implemented system includes features of diversity and redundancy, which need not be described herein. It should be understood, however, that the present invention can be implemented in different kinds of safety control systems, and with different levels of redundancy and diversity.

In FIG. 2, for a given nuclear reactor, the safety control system has four channels A, B, C, and D, with respective Core Protection Calculators, each of which embodies identical techniques and algorithms for computing, e.g., whether the operation of the core is within the safe operating envelope, by a sufficient margin to enable the reactor to safely trip by, among other things, dropping all of the control element assemblies by gravity into the fully inserted position in the core.

Each Core Protection Calculator receives input signals indicative of the position of particular CEA's. Also, a CEA Calculator receives CEA position signals, and determines whether, among a particular group of CEA's which are programmed to move in unison, a deviation in position exists among the grouped CEA's, such that a power distribution penalty must be taken into account by the Core Protection Calculator. The CEA Calculators also deliver output signals to a CRT display visible to the operator in the control room, for visually monitoring CEA position and/or group deviations.

For purposes of the remainder of the present description, in relation to FIG. 2, the reader need only appreciate that means responsive to the movement of each control element generates a position signal having a value which varies with the movement of the control element, and this signal is delivered to analogue input lines in each of the channels A, B, C and D of the safety control system. Such means are typically reed switches.

Figure 3:
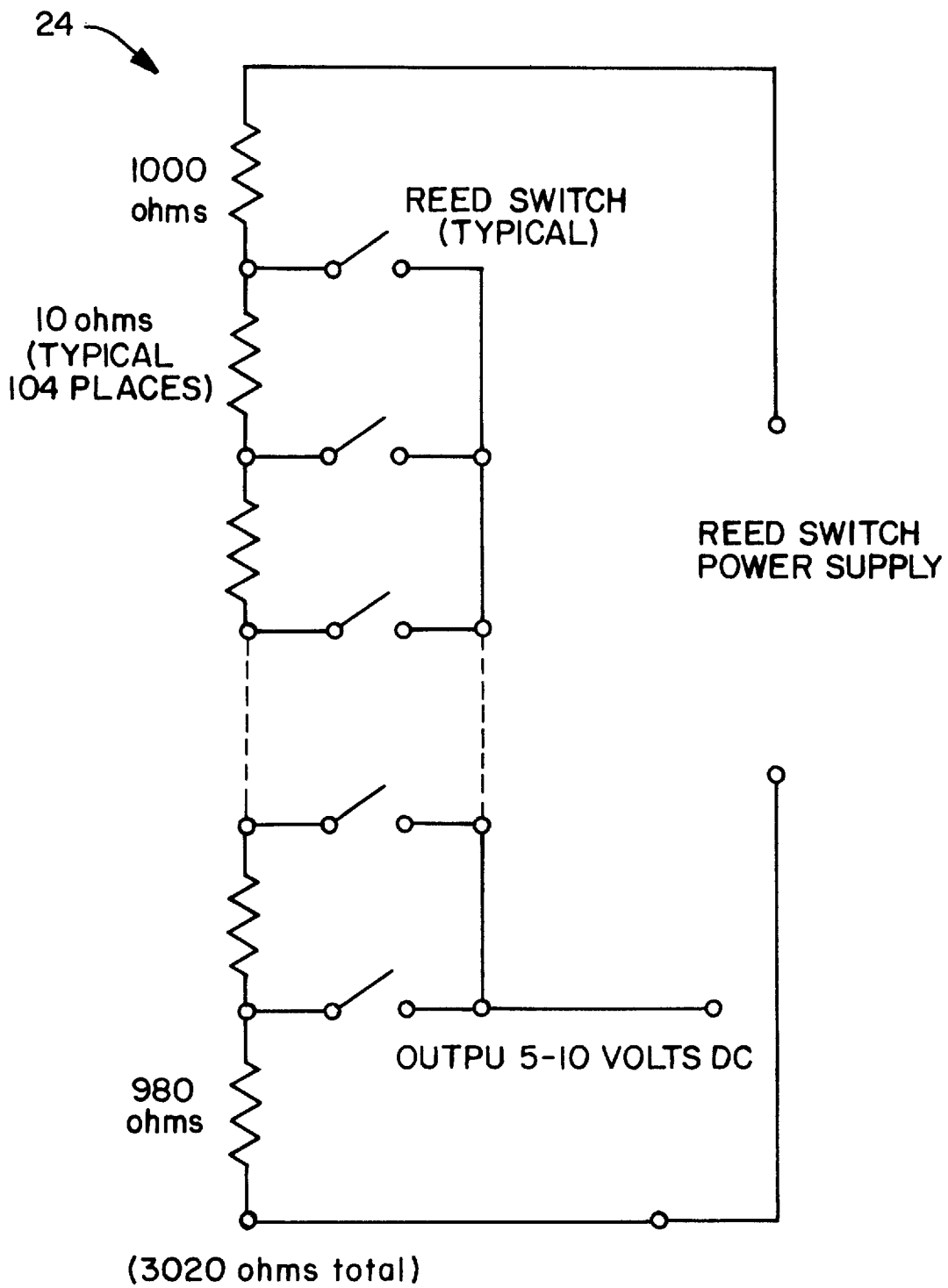
FIG. 3 is a schematic of a typical reed switch configuration associated with the shaft of a control element assembly, for providing a step-wise control element assembly position signal.

FIG. 3 is a schematic of a typical reed switch array 24, in which the movement of the CEA shaft can be sensed according to, e.g., 104 distinct switch responses, i.e., if the difference in elevation between the fully withdrawn and fully inserted position of the CEA is 104 inches, CEA position can be sensed according to one inch increments. Reed switch arrays have been utilized for CEA position sensing for decades, and need not be described in any greater detail herein.

According to the invention, the safety control system, e.g., the portion 42 thereof depicted in FIG. 2, is modified to include a technique that distinguishes between drift or other spurious signals in the CEA position signal, and actual CEA movement. The distinguishing feature is that the actual CEA movement causes sequential changes in the state of the set of reed switches such as shown in FIG. 3, whereby valid changes in the CEA position signal to the control system, would have a "stair-step" characteristic. In contrast, spurious changes such as caused by slow drifts in signal strengths, would not exhibit a uniform stair-step characteristic.

Figure 4:
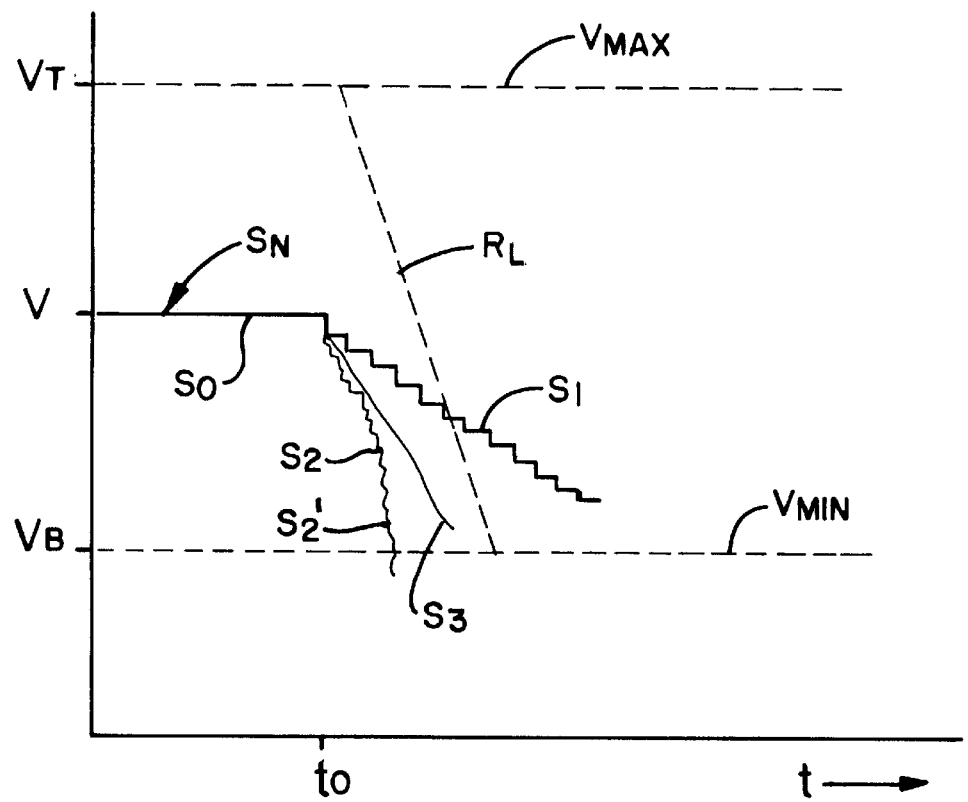
FIG. 4 is a graph representing several possible voltage output signals from the reed switch shown in FIG. 3, under normal and abnormal conditions.
Figure 5:
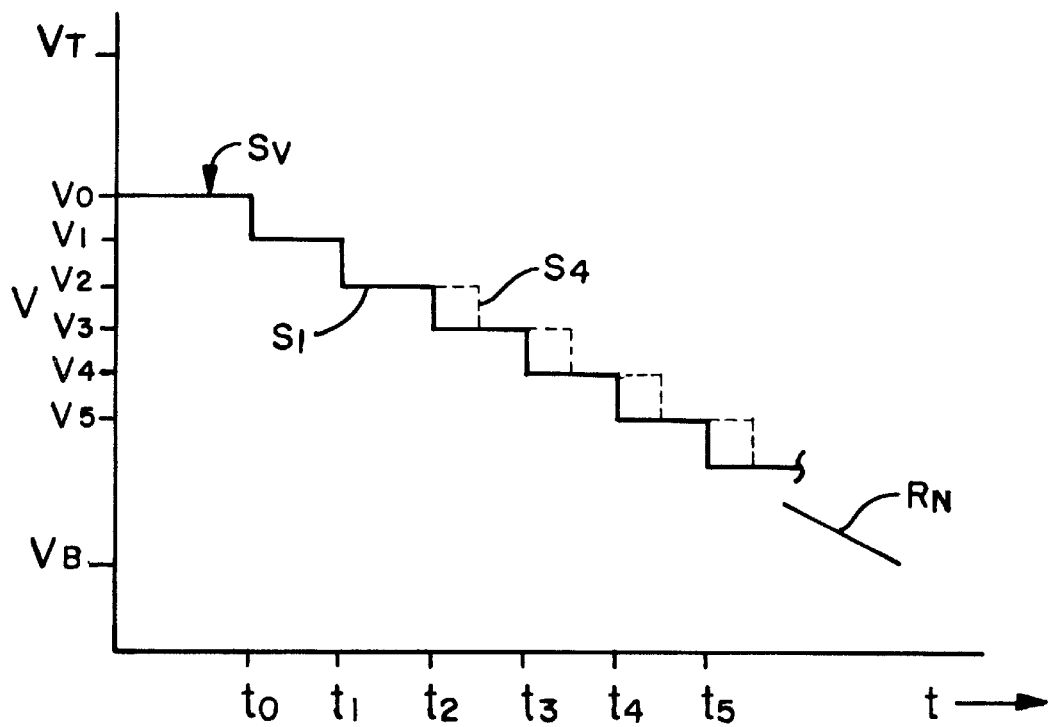
FIG. 5 is a detailed view of two illustrative voltage output signals from the reed switch shown in FIG. 3.

FIGS. 4 and 5 graphically illustrate how this inventive concept can be implemented at, for example, the CEA Calculator, or at a preprocessing unit or filter 44 (FIG. 2). In FIG. 4, the output voltage of the reed switch array, has a value $V_t$ corresponding to the top, or fully withdrawn position of a CEA, and a value $V_b$, corresponding to a bottom, or fully inserted position. This voltage could, for example, span 5–10 volts. A position signal $S_n$ is shown, as having a constant value indicated by signal portion $S_0$, and then at a time $T_0$, the position signal appears as a series of steps of decreasing voltage, which resemble a descending staircase, indicated at signal portion $S_1$. The signal portion $S_1$ is that to be expected from normal insertion of a CEA for control purposes, as driven via lines 38, 40 in FIG. 1, rather than scrammed via lines 32, 34.

Another position signal $S_2$ is shown, initiating from time $T_0$ which exhibits some stepwise structure, but not a uniform structure. Signal $S_2$ assumes a steeper slope as time progresses along the time axis. Signal $S_3$ follows a more uniform rate of decrease than signal $S_2$, but it does not have any structure which resembles a stepwise progression.

It should be appreciated that the purpose of the present invention is to determine whether the change in position signal, as represented for example by signals $S_1$, $S_2$, and $S_3$, conform to a regular, predetermined pattern, characteristic of normal control element motion, and if any change deviates from such pattern by more than a permissible tolerance, to generate an invalidity signal.

FIG. 5 provides detail regarding the normal signal $S_n$, especially in the portion beginning at time $T_0$, as represented by $S_1$. On the basis that the normal signal in FIG. 5 corresponds to that of a driven CEA, which passes through the core at a normal rate in time, it can be seen that such movement produces a series of increments or decrements represented by the differences $V_0–V_1$; $V_1–V_2$; $V_2–V_3$; etc. (Hereinafter "increment" should be understood as also including "decrement"). These increments are uniform in magnitude and in time frequency, as shown by the corresponding differences $T_1-T_0$; $T_2-T_1$; $T_3-T_2$; etc. (If the position signal changes value in uniform time increments, the increments can be understood as having a time frequency.) The staircase signal $S_1$, descends at a rate in time, proportional to the rate in time of the positional change of the control element when normally driven into the core. If linearized, this rate can be represented by a rate line such as $R_n$.

Although the voltage signals represented in FIGS. 4 and 5 are analogue signals, as generated at the output of the reed switch array of FIG. 3, this analogue signal can be sampled digitally in a well known manner, e.g., at a sampling or monitoring frequency which is at least about five times the uniform time frequency associated with normal actuation of the CEA. For example, five samples can be taken during one of the time intervals such as $T_2-T_1$. As a result, a series of discrete position values versus time can be produced, corresponding to the analogue signal trace shown in FIG. 5.

Whether or not sampled digitally, the analogue or digitized trace corresponding to $S_n$ in FIG. 5 defines the target pattern, which should have a permissible tolerance associated therewith, to assure that slight deviations from the ideal trace, due to noise, vibration, temperature changes and the like, do not result in the unintended invalidation of the position signal. For example, an acceptance criterion can be established such that the pattern for confirming validity, requires that at least four of any consecutive five increments in position signal value occur with the same elapsed time, from the respective immediately previously monitored increment in value. The dotted line in FIG. 5 represents a position signal $S_4$ which is identical to the normal signal $S_n$ until time $T_2$. Instead of decreasing to voltage $V_3$ at time $T_2$, the signal remains at voltage $V_2$ until a sampled time point between $T_2$ and $T_3$. However, subsequent to the time when the signal $S_4$ decremented to the value $V_3$, the normal staircase pattern is maintained for three more time intervals. Since four out of a consecutive five decrements occurred at the same elapsed time from the respective immediately previously monitored decrement in value during the time period $T_5-T_0$, even the signal $S_4$ would be deemed valid, and delivered as such to the safety control system shown in FIG. 2.

An analogous criteria can be established for the magnitude of the position signal, i.e., that at least four of any consecutive five increments in the position signal, have the same magnitude during a preselected time period corresponding to five normal increments (e.g., the period $T_5-T_0$). Moreover, the acceptance criteria could include the combination of the four out of five logic described above, for both the magnitude increment and the time interval increment.

It can be appreciated that neither of the signals $S_2$ nor $S_3$ shown in FIG. 4, satisfies any of the three pattern criteria described immediately above (i.e., consecutive increments in magnitude, consecutive increments in time interval, or a combination thereof). Therefore, the receipt of a signal $S_2$ or $S_3$ by the processing associated with the present invention, would result in the generation of an invalidity signal, which is in turn delivered or used in the control system. As a result of the invalidity signal, the control system does not respond to the apparent change in the control element position as manifested by the change in the value of the control element position signal.

The validity processing according to the present invention can be used in addition to other filtering which in some instances has been used with safety control systems of the type shown in FIG. 2. For example, the voltage $V_t$ could define the cutoff ceiling $V_{max}$, and the voltage $V_b$ could define a cutoff floor $V_{min}$, such that any voltage above $V_{max}$ is limited in value to $V_{max}$, and likewise any voltage below $V_{min}$, is limited to $V_{min}$. In FIG. 4, it can be seen that the portion $S_2'$ of signal $S_2$ has dropped below the voltage $V_{min}$, and would thus be subject to such limit. Furthermore, the portion $S_2'$ of signal portion $S_2$ exhibits a rate of decrease that is faster than the rate $R_1$ shown in FIG. 4. Conventional control systems of the type shown in FIG. 2, sometimes have a rate limit filter whereby the rate of change of the control element position signal is limited to be less than a pre-established value of $R_1$ (which in turn is established based on the normal value $R_n$ shown in FIG. 5).

Although the limit filters associated with CEA position ($V_{max}$ and $V_{min}$) and rate of movement ($R_1$) have in some instances been utilized as signal validity criteria (because a signal which exceeded these limits was considered invalid and therefore not used in the control system, or else the last valid signal was used by the control system), many of the abnormalities in position signal which have caused operational problems, lie within these range and rate limits. Such abnormalities arise from temperature changes affecting electrical components, vibration affecting electrical connections, or corrosion affecting electrical connections. These tend to have slow, regular or irregular, characteristics, whose rate of change is not dependent on the rate at which a CEA may be driven.

The present invention can be used in combination with such range and rate limits, either sequentially (i.e., as at 44 in FIG. 2, before or after the position signal "passes through" the range and rate filtering in the Core Protection Calculators), or the invention can be used in combination therewith. All relevant information about the validity of the signal can be displayed to the operator at, for example, the CRT indicated in FIG. 2.

If desirable, the invention could include a further validity screening technique, associated with the trip of the CEA's, whereby the voltage versus time relationship shown in FIG. 5 would be compressed such that each time interval $T_1-T_0$, $T_2-T_1$ . . . would be in the range of 0.01 to 0.02 seconds.

It should be appreciated that the invention is applicable to control element position and movement, whether the control element is in the form of an assembly or an individual rod. Accordingly, the term "control element" as used in the appended claims should be understood to include single or plural control rods.

I claim:

1. In a nuclear reactor installation having a reactor core, a control element movable by a drive mechanism through the reactor core, means responsive to the movement of the control element for generating a position signal having a value which varies with the movement of the control element, and a control system responsive to changes in the reactor core including a change in the control element position as manifested by a change in the value of said control element position signal, a method for verifying said position signal, comprising:

monitoring changes in the value of the position signal over a preselected time period;

determining whether said changes conform to a regular, predetermined pattern characteristic of normal control element motion; and if any change deviates from said pattern by more than a permissible tolerance, generating an invalidity signal.

2. The method of claim 1, wherein said pattern is a series of steps which resemble a staircase that ascends or descends.

3. The method of claim 2, wherein the staircase descends at a rate in time, proportional to the rate in time of the positional change of the control element during a reactor scram.

4. The method of claim 2, wherein the staircase descends at a rate in time, proportional to the rate in time of the positional change of the control element when normally driven into the core.

5. The method of claim 1, wherein
   driving the control element into the core at a normal rate in time, produces a series of increments in the value of the control element position signal, which are uniform in magnitude, and
   said pattern requires that at least four of any consecutive five increments in the position signal, have the same magnitude.

6. The method of claim 1, wherein
   driving the control element into the core at a normal rate in time, produces a series of increments in the value of the control element position signal, which are uniform in magnitude and time frequency, and
   said pattern requires that at least four of any consecutive five increments in the position signal, have the same magnitude.

7. The method of claim 1, wherein
   driving the control element into the core at a normal rate in time, produces a series of increments in the value of the control element position signal, which are uniform in time frequency, and
   said pattern requires that for any five consecutive increments in the value of the position signal, each of at least four increments occur at the same elapsed time from the respective immediately previously monitored increment in value.

8. The method of claim 1, wherein
   driving the control element into the core at a normal rate in time, produces a series of increments in the value of the control element position signal, which are uniform in magnitude and time frequency, and
   said pattern requires that for any five consecutive increments in the value of the position signal, each of at least four increments occur at the same elapsed time from the respective immediately previously monitored increment in value.

9. The method of claim 6, wherein the value of the position signal is monitored at a monitoring frequency which is at least about five times said uniform time frequency.

10. The method of claim 7, wherein the value of the position signal is monitored at a monitoring frequency which is at least about five times said uniform time frequency.

11. The method of claim 1, wherein the invalidity signal is displayed at a display panel in a control room of the nuclear reactor installation.

12. The method of claim 1, wherein the invalidity signal is delivered to said control system, and in response to said invalidity signal the control system does not respond to a change in the control element position as manifested by said change in the value of said control element position signal.

13. The method of claim 1, wherein the control system includes a range filter that generates a range fault signal if the value of the position signal is outside preestablished maximum and minimum normal magnitudes, and the step of determining is performed only in the absence of said range fault signal.

14. The method of claim 1, wherein the control system includes a rate filter that generates a rate fault signal if the time rate of change in the magnitude of the value of the position signal is outside preestablished maximum and minimum normal rates, and the step of determining is performed only in the absence of said range fault signal.

15. The method of claim 1, wherein the control system includes a range filter that generates a range fault signal if the value of the position signal is outside preestablished maximum and minimum normal magnitudes, and the step of determining is performed after the position signal passes through said range filter.

16. The method of claim 1, wherein the control system includes a rate filter that generates a rate fault signal if the time rate of change in the magnitude of the value of the position signal is outside preestablished maximum and minimum normal rates, and the step of determining is performed after the position signal passes through said rate filter.

17. The method of claim 1, wherein
   driving the control element into the core at a normal rate in time produces a series of uniform increments in the value of the control element position signal, which occur at a uniform time frequency, and
   the value of the position signal is monitored at a monitoring frequency which is at least about five times said uniform time frequency.

18. The method of claim 17, wherein the invalidity signal is displayed at a display panel in a control room of the nuclear reactor installation.

19. The method of claim 17, wherein the invalidity signal is delivered to said control system, and in response to said invalidity signal the control system does not respond to a change in the control element position as manifested by said change in the value of said control element position signal.

* * * * *